H. H. HARRIS.
TRUCK STEERING MECHANISM.
APPLICATION FILED JAN. 31, 1911.

1,069,417.

Patented Aug. 5, 1913.
2 SHEETS—SHEET 1.

Witnesses
Brennan B. West.
Elmer R. Caspell.

Inventor
Hollis H. Harris,
By Albert H. Baker
Atty.

H. H. HARRIS.
TRUCK STEERING MECHANISM.
APPLICATION FILED JAN. 31, 1911.

1,069,417.

Patented Aug. 5, 1913.

2 SHEETS—SHEET 2.

Witnesses

Inventor
Hollis H. Harris.
By Albert H. Baker
Atty.

UNITED STATES PATENT OFFICE.

HOLLIS H. HARRIS, OF LORAIN, OHIO, ASSIGNOR TO THE THEW AUTOMATIC SHOVEL COMPANY, OF LORAIN, OHIO, A CORPORATION OF OHIO.

TRUCK-STEERING MECHANISM.

1,069,417.

Specification of Letters Patent.

Patented Aug. 5, 1913.

Application filed January 31, 1911. Serial No. 605,315.

*To all whom it may concern:*

Be it known that I, HOLLIS H. HARRIS, a citizen of the United States, residing at Lorain, in the county of Lorain and State of Ohio, have invented a certain new and useful Improvement in Truck-Steering Mechanism, of which the following is a full, clear, and exact description, reference being had to the accompanying drawings.

The object of this invention is to provide a very efficient arrangement for steering the truck of portable heavy machinery.

The invention is especially designed with reference to a steam shovel or other excavating apparatus mounted on a wheeled truck adapted to travel over roads, streets, etc.

The invention includes effective mechanism by which one pair of wheels may be turned, as desired, to steer the truck. This is combined with a connection to the swiveled superstructure which is a supporting platform carrying the boom and driving mechanism so that the turning of such superstructure automatically turns the wheels to effect the proper steering. This is of great value in a self propelled portable machine of this character, as it enables the operator, by simply turning his superstructure to bring its length in the desired direction of travel, to automatically turn the truck correspondingly, thus enabling him to conveniently turn corners, pass around obstructions, follow irregular roads, etc. By a simple arrangement, included within this invention, I am enabled to disconnect the automatic steering and steer by hand, independent of the superstructure, whenever desired.

The invention is hereinafter more fully explained and its essentials set out in the claims.

Figure 1:
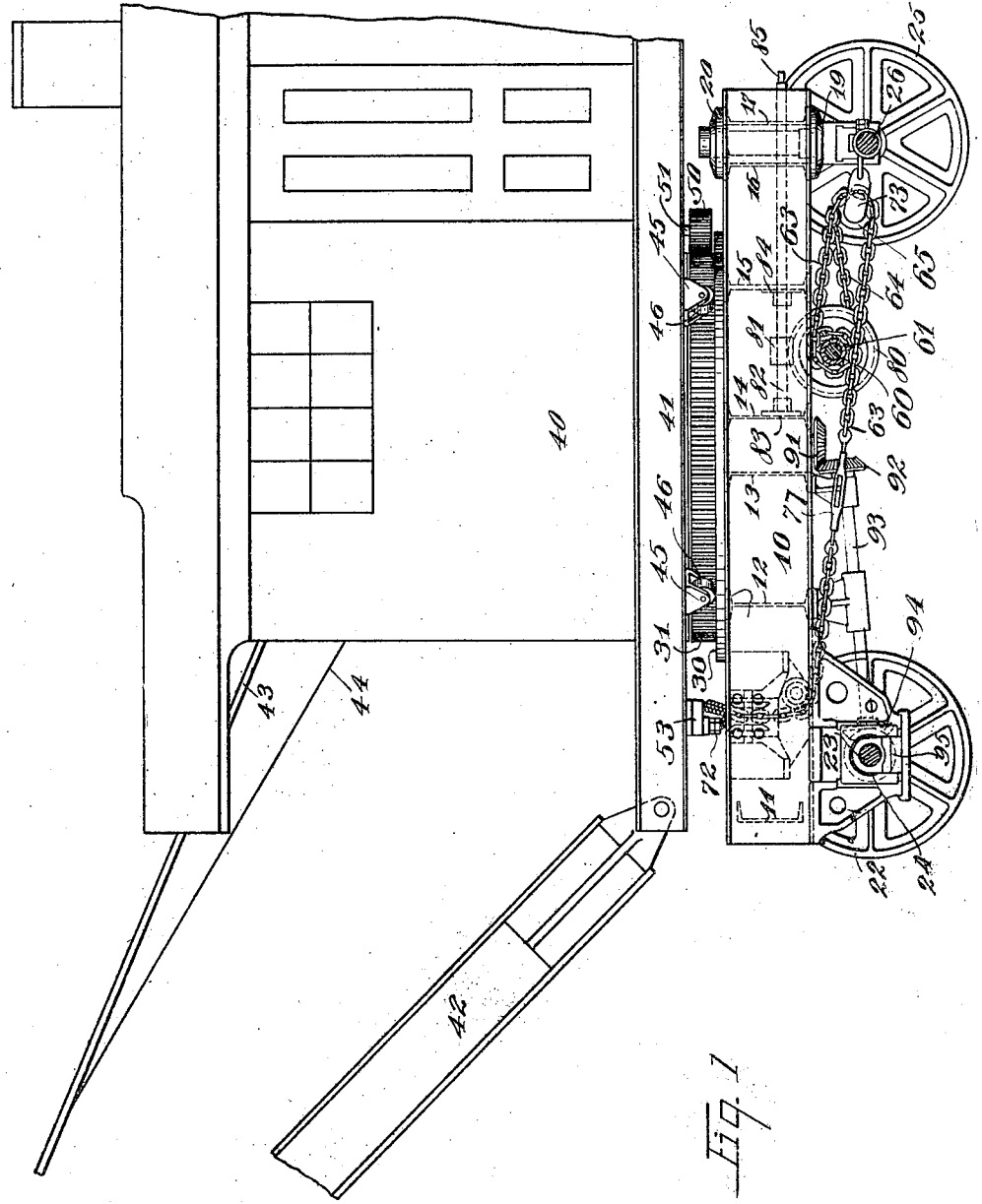
Figure 2:
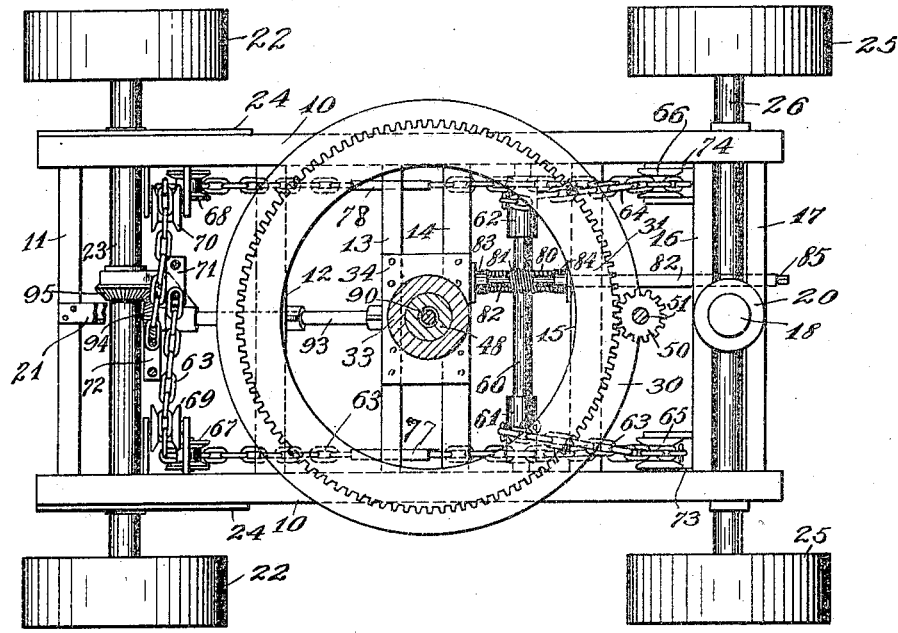
Figure 3:
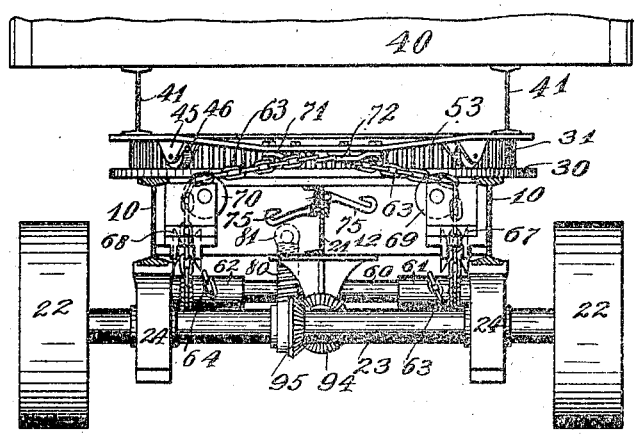

In the drawings, Figure 1 is a side elevation of a portion of a steam shovel or similar machine equipped with my invention; Fig. 2 is a sectional plan just above the truck, being sectioned through the king pin or swivel and the vertical propelling and turning shafts; Fig. 3 is a front elevation of the truck, a portion of the beams at the front being removed for clearness.

As shown in the drawings, the truck frame consists of a pair of longitudinal beams 10, 10 and cross beams between them. The longitudinal beams are in the form of I-beams. A number of cross beams are shown, designated in the drawings 11 to 17 inclusive. The cross beams 12, 14 and 15 are shown as I-beams and the other cross beams as channel-beams, though it is to be understood that this selection of rolled shapes may be varied as desired.

22 indicates two of the wheels of the truck which are rigidly mounted on an axle 23 journaled in bearings 24 carried on the under sides of the respective beams 10. It is convenient to refer to these wheels as the front wheels, though the travel of the machine may be in the opposite direction, so that they would then be rear wheels. Assuming that the wheels 22 are the front wheels, a pair of wheels 25 constitute the rear wheels. These latter are rotatably mounted on an axle 26 which is swiveled at its center. The swivel pin is designated 18 and is shown as mounted in annular caps 19 and 20 carried by the cross beams 16 and 17. This rear axle being swiveled, it is only necessary to turn it on its center bearing one way or the other to steer the machine as desired. The mechanism for accomplishing this, which constitutes the primary feature of this invention, will be hereinafter described.

Mounted on the upper face of the longitudinal beams 10, 10 and the cross beams 12 and 15 is a substantially horizontal annular trackway 30 and a stationary horizontal spur gear 31.

The superstructure is shown as consisting of a cab 40 mounted on longitudinal beams 41 which carry the usual boom 42. The upper end of this boom may be held by a suitable tie 43.

44 indicates the elevating cable.

Connected with the beams 41 are cross members, on the under sides of which are brackets 45 carrying rollers 46 which rest on the trackway 30. A central king-pin mechanism is provided consisting of cylindrical embracing members 33 and 48, one of which depends from the superstructure and the other of which rises from a plate 34 mounted on the cross beams 13 and 14 of the truck.

50 indicates a pinion meshing with the gear 31, and 51, the shaft of this pinion extending up into the superstructure. Suitable mechanism, (not shown) in the superstructure, by rotating this shaft 51, may turn the superstructure in one direction or the other about the king-pin, the wheels 46 traveling around the annular support 30.

Mounted in suitable bearings in the truck frame is the transverse shaft 60 on which are two enlargements or drums 61 and 62. Anchored to these drums are two chains 63 and 64. The chain 63 passes off of the upper side of the drum 61, then rearwardly over a pulley 65 and thence forwardly around pulleys 67 and 69 and may be anchored at its forward end to the superstructure, as illustrated by the hook 71 mounted on the under side of a cross member 53 of the superstructure. Similarly, the chain 64, which passes off of the under side of the drum 62, passes over a pulley 66 and thence forwardly around pulleys 68 and 70 and may be anchored to the superstructure by means of a hook 72. The pulleys 65 and 66 are movable pulleys mounted in straps 73 and 74 connected with the axle 26.

From the construction described, it will be seen that if the shaft 60 is held from rotation, the turning of the superstructure will automatically turn the rear axle. For example, if the superstructure is turned to move its forward end toward the right, tension will be applied to the chain 63, which will draw forward the left hand rear wheels 25, the same movement slackening on the chain 64, allowing the pulley 66 and other rear wheel to travel rearwardly. Correspondingly, a movement of the superstructure toward the left pulls on the chain 64 and slackens on the chain 63. The length of the chains 63 and 64 may be adjusted with the desired accuracy by means of turnbuckles 77 and 78 included in them. In the operation described, I have assumed that the shaft 60 is held against rotation. It is desirable, however, to have this shaft rotatable so that it may effect the steering by hand, the forward ends of the chains, in that case, being anchored to the truck. 75, 75 in Fig. 3, illustrates a pair of hooks carried by a frame member 21 of the truck, to which hooks the forward ends of the chain may be anchored. When so anchored, a rotation of the shaft 60 will pull on one of the chains, and move the corresponding pulley connected with the rear axle, and will slacken on the opposite chain, thereby swinging the axle 26 on its swivel.

In order to enable the shaft 60 to be turned whenever desired, for hand steering, and to be held for automatic steering, I have provided a worm gear connection to it which makes at once an automatic lock and a rotating driving mechanism. In accomplishing this, I mount on the shaft 60 a worm wheel 80 with which meshes a worm 81 on a shaft 82. This shaft is shown as mounted in bearings 83 and 84 in the cross beams 14 and 15. The shaft extends through openings in the beams 16 and 17 and has at its extreme rear end, an angular extension 85. A suitable crank applied to this extension may rotate the shaft 82, thereby rotating the shaft 60 when steering by hand. When the automatic steering is being effected, the worm makes an automatic lock, preventing rotation of the shaft 60.

My automatic steering mechanism may be employed, irrespective of the method of moving the vehicle. It is particularly well adapted, however, for self propelled vehicles, and such is the vehicle illustrated. The propulsion is accomplished through a central vertical shaft 90, which extends downwardly from the superstructure or platform through the king-pin mechanism, and at its lower end is suitably geared with the driving axle. The gearing shown consists of a bevel 91, on the shaft 90, which meshes with a bevel 92 on a shaft 93, which carries at its forward end a bevel 94 meshing with a bevel 95 on the front axle 23. Suitable mechanism (not shown) within the cab 40 is adapted to rotate the shaft 90 and thereby propel the vehicle. The swinging of the boom one way or the other and the concurrent turning of the axle 26 may be accomplished while the machine is in motion, being propelled by a shaft 90 and its gearing. This swinging and automatic turning may also be accomplished while the machine is otherwise stationary. Likewise, the machine may be steered by hand by a crank applied to the rear end of the shaft 82, whether the machine is moving or stationary. Accordingly, the construction described provides complete steering mechanism adapted to effectively meet all conditions.

Having thus described my invention, what I claim is:—

1. In a mechanism of the character described, the combination, with a wheeled truck and a supporting platform swiveled thereon, a boom mounted on said platform, steering mechanism operated by turning the platform, and mechanism for turning the platform and thereby swinging the boom and correspondingly operating the steering mechanism.

2. The combination of a truck frame, two pairs of wheels therefor, one pair being mounted on an axle swiveled to the frame, a supporting platform rotatably mounted above the truck, a boom mounted on the platform, and a flexible member leading from the supporting platform to the swiveled axle and passing over pulleys, whereby the turning of the supporting platform may swing the axle on its swivel, and mechanism for turning the platform.

3. In a machine of the character described, the combination of a truck frame, two pairs of wheels therefor, one pair having an axle intermediately swiveled to the frame, a supporting platform rotatably mounted above the track frame, a boom projecting from one end of the platform, pulleys carried by the frame, flexible members adapted to be connected with the supporting platform and passing over the pulleys and connected with the swiveled axle, and mechanism for swinging the platform with its boom on the swivel axis of the platform and thereby automatically turning the steering wheels.

4. The combination, with a truck having a swiveled axle, of a pair of pulleys connected therewith, flexible members passing around said pulleys, a supporting platform movably mounted on the truck, a boom and raising mechanism carried by the platform, means for connecting the flexible members thereto, and mechanism for moving the platform and boom and thereby automatically swinging said axle on its swivel.

5. The combination, with a truck having one of its axles swivelly connected to the truck, a pair of pulleys connected with said axle, a shaft, a pair of flexible members leading from opposite sides of the shaft around the two pulleys, a supporting platform on the truck, a boom and raising mechanism mounted on the platform, means for connecting the upper ends of the flexible members thereto, means for holding such shaft against rotation, and mechanism for moving the platform and boom and thereby automatically swinging said axle on its swivel.

6. The combination, with a wheeled truck and a supporting platform mounted thereon, a boom extending from one end of the platform, raising mechanism supported by the platform including an elevating cable extending lengthwise of the boom, of a rotatable shaft on the truck, means for holding said shaft and for rotating it as desired, flexible members leading from opposite sides of said shaft around pulleys connected with the axle of one pair of truck wheels, means for anchoring the other ends of said flexible members to the supporting platform, and mechanism for swinging the platform.

7. In a machine of the character described, the combination of a wheeled truck, a platform swiveled thereon, a boom carried by the platform, an axle for one pair of wheels, movable pulleys connected therewith, flexible members passing over said pulleys, and means for anchoring either end of said flexible members and pulling on the other end.

8. The combination, with a wheeled truck, of an axle for one pair of wheels, pulleys connected therewith, a rotatable shaft, a pair of flexible members leading from opposite sides of said shaft over said pulleys, a movable superstructure on the truck, a boom and raising mechanism carried by the superstructure, means for anchoring said flexible members at will to the superstructure or the truck body, and means for locking said shaft against rotation or rotating it at will.

9. The combination with a truck having wheels, one pair of which are mounted on an axle frame swiveled to the truck, of a rotatable shaft carried by the truck frame, a pair of pulleys connected with the axle, a pair of drums on the shaft, chains leading from the upper and lower portions of said drums respectively and passing around the pulleys respectively, guide pulleys over which such chains travel, and anchorages for the other ends of the chains.

10. The combination, with a truck having wheels, one pair of which are mounted on an axle frame swiveled to the truck, of a rotatable shaft carried by the truck frame, a pair of pulleys connected with the axle, a pair of drums on the shaft, chains leading from the upper and lower portions of said drums respectively and passing around the pulleys respectively, guide pulleys over which such chains travel, and two anchorages for the other ends of the chains, one on the truck frame and the other on a swiveled superstructure, and means for locking the shaft against rotation and for rotating the shaft as desired.

11. In a machine of the character described, the combination, with a wheeled truck, of a superstructure swivelly mounted above the same, a boom and raising mechanism carried thereby, a central vertical driving shaft, gearing between the same and one pair of wheels for propelling the vehicle, mechanism for rotating the superstructure with reference to the truck, and mechanism whereby such rotation turns the other pair of wheels.

12. The combination of a wheeled truck having one pair of wheels adapted to be turned to steer the truck, a supporting platform mounted to turn on the top of the truck, a boom supported by the truck and mechanism coöperating therewith, mechanism for turning the supporting platform, and flexible connecting mechanism between the supporting platform and the pair of wheels which are adapted to steer the truck.

13. The combination, with a truck having a frame and four wheels, one pair of which are adapted to be turned to steer the truck, a superstructure swiveled on the truck and having a boom, flexible mechanism connecting the superstructure with a pair of wheels which may be turned, means for turning the superstructure with reference to the truck whereby, when the boom is turned with reference to the desired course of travel, the truck will be automatically steered correspondingly.

14. The combination, with a truck having a frame and wheels, one pair of wheels being adapted to turn to steer the truck, of a turn table on the top of the truck, a superstructure mounted on the turn table, a driving shaft at the center of the turn table depending from the superstructure, gearing connecting the same with the pair of wheels which are not turned to steer, a pair of flexible members connecting the superstructure with the other pair of wheels to automatically steer when the superstructure is turned, and mechanism for turning the superstructure.

15. The combination, with a wheeled truck and a superstructure swivelly mounted thereon, mechanism for driving the truck, mechanism for turning the superstructure, mechanism for steering the truck by means of turning the superstructure, and mechanism for steering the truck by hand independently of the turning of the superstructure.

16. In a machine of the class described, the combination of a truck frame, four wheels therefor, one pair of wheels being mounted on an axle frame connected by a swivel with the truck frame, a turn table on top of the truck frame, a superstructure rotatably mounted above the turn table, a central vertical drive shaft, a connection between the same and the pair of wheels whose axle is not swiveled, a transverse shaft carried by the truck frame, a pair of pulleys connected with the swiveled axle, flexible members leading respectively from the top and bottom of said transverse shaft passing around said pulleys and over guide pulleys on the truck frame and anchored to the superstructure, means on the truck frame for also anchoring the said flexible members, means on the truck frame for locking or rotating the transverse shaft, and means for turning the superstructure on the turn table.

17. The combination, with a truck comprising a frame and steering wheels therefor, of a platform rotatably mounted on said frame, means for imparting rotary movement to said platform, and a flexible connection between said platform and said steering wheels, whereby the latter will be actuated by the movement of said platform.

18. The combination, with a truck comprising a frame, and steering wheels therefor, of a platform rotatably mounted on said frame, flexible devices connected with said steering wheels, and means to connect said devices with either said platform or said frame.

19. The combination, with a truck comprising a frame and steering wheels therefor, of a platform rotatably mounted on said frame, means for imparting rotary movement to said platform, and means controlled by the rotary movement of said platform for imparting a steering movement to said steering wheels.

20. The combination, with a truck comprising a frame, a steering axle therefor, and steering wheels on said axle, of a platform rotatably mounted on said frame, chains connected with said axle on the opposite sides of the pivotal center thereof, means for detachably connecting said chains with said platform, and other means for detachably connecting said chains with said frame.

21. The combination, with a truck comprising a frame, a steering axle therefor, and steering wheels on said axle, of a platform rotatably mounted on said frame, a chain connected with said steering axle near the end thereof and extending therefrom toward the other end of the frame, a guide for said chain near said other end of said frame, and means for detachably connecting said chain to that side of said platform opposite the end of the axle with which said chain is connected.

22. The combination, with a truck comprising a frame, a steering axle therefor, and steering wheels on said axle, of a platform rotatably mounted on said frame, a pair of chains connected with said axle on opposite sides of the center thereof, guides for said chains near the opposite end of said frame, grab hooks secured to said platform and adapted to engage the respective chains, and holding devices secured to said frame and adapted to receive links of the respective chains.

23. The combination, with a truck having steering wheels, of a stationary gear carried by the truck, a platform swiveled on the truck carrying a driving pinion adapted to mesh with said gear, and a flexible connection between the platform and steering wheels whereby the latter will be actuated by a movement of the platform.

24. The combination of a wheeled truck having one pair of wheels mounted on a movable axle, a platform swiveled on the truck, movable pulleys on the axle on opposite sides of its pivot, a pair of flexible members passing over said pulleys, a winding device with which said flexible members are connected at one end, means for locking the winding device, and means for connecting the flexible members at the other end either to the truck frame or to the platform, whereby the truck may be steered by hand by rotating the winding device or automatically by turning the platform.

25. In a machine of the character described, the combination, with a truck frame, of wheels therefor, a pivoted axle on which one pair of wheels is journaled, movable pulleys connected with the axle and winding shaft, self-locking rotating mechanism therefor, a pair of flexible members connected with the winding shaft and passing off of its opposite sides around the movable pulleys, means for anchoring the flexible members at their other ends, a platform swiveled on the truck frame, and means for connecting the last mentioned ends of the flexible members with the platform.

26. The combination of a wheeled truck having an axle pivoted to the truck frame, movable pulleys connected with said axle on opposite sides of its pivot, a winding shaft, a worm wheel on the winding shaft, a worm meshing with the worm wheel, a pair of flexible members passing respectively from the top and bottom of the winding shaft around the movable pulleys, a platform swiveled on the truck, and means for connecting the other ends of the flexible members to the platform or to the truck frame, as desired.

27. The combination, with a truck comprising a frame and wheels, two of which are shiftable to steer, of a platform rotatably mounted on the frame, a boom projecting from the platform and adapted to project over the end of the truck opposite the steering wheels, flexible connections between the platform adjacent to the heel of the boom and the steering wheels at the other end of the truck, whereby when the platform swings the boom at one end of the truck it may automatically and correspondingly shift the wheels at the other end, and means for swinging the platform.

28. The combination of a truck having a frame and wheels, one pair of which are shiftable to steer and the other pair of which are non-shiftable, a platform rotatably mounted on the frame, a boom projecting from one end of the platform and adapted to overhang the non-steering end of the truck, flexible devices connected with the steering wheels, and means to connect said devices at will either with the truck frame or with the platform adjacent to the heel of the boom, whereby when the boom at one end of the truck is swung the steering wheels at the other end may be automatically swung correspondingly.

In testimony whereof, I hereunto affix my signature in the presence of two witnesses.

HOLLIS H. HARRIS.

Witnesses:
ALBERT H. BATES,
BRENNAN B. WEST.